United States Patent Office 3,463,856
METHOD FOR CONTROLLING PHYTOPATHO-
GENIC FUNGI AND BACTERIA ON PLANTS
BY APPLYING DICHLOROALKENYLHYDRO-
PHTHALIMIDES THERETO
Masaru Kado, Shimizu, Japan, assignor to Ihara Chemicals Company Limited, Shimizu, Japan
No Drawing. Filed Apr. 27, 1967, Ser. No. 634,108
Claims priority, application Japan, Apr. 5, 1967,
42/21,165
Int. Cl. A01n 9/22; C07d 27/36
U.S. Cl. 424—274                                   2 Claims

ABSTRACT OF THE DISCLOSURE

A fungicidal and bactericidal composition comprising as an active ingredient the compound of the formula

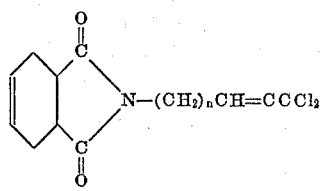

wherein $n$ is an integer selected from the group consisting of 1, 3, 5 and 7, in the presence of an inert diluent and a method for controlling phytopathogenic fungi and bacteria by using said composition.

---

The present invention relates to bactericidal and fungicidal compositions containing dichloroalkenyl hydrophthalimides as active ingredient and a method for preventing bacterial and fungus diseases of agricultural plants by using dichloroalkenylhydrophthalimides as the active ingredient.

Dichloroalkenylhydrophthalimides have the following formula,

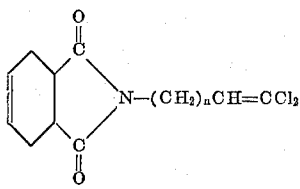

wherein $n$ is 1, 3, 5 or 7.

When dichloroalkenylhydrophthalimides according to the present invention are used for prevention of diseases of agricultural plants, said substances show remarkable preventive effect.

In order to prevent rice blast (*Piricularia oryzae*), which is the most hazardous pest for rice plant, organomercuric compounds, such as phenylmercuric acetate, phenylmercuric iodide, etc. have been used, but mercury is poor in resources and when spraying the organomercuric compounds on the plants, mercury remains in the plant, so that the use of mercuric compound has defect.

Dichloroalkenylhydrophthalimides according to the present invention can be used instead of these mercuric compounds and are effective for prevention of rice blast, sheath blight (*Pellicularia sasakii*), anthracnose (*Colletotrichum logenarium*).

Particularly, the bactericidal and fungicidal activity can be developed in a small dose and these compounds cause no phytotoxicity and can be used safely.

The bactericidal and fungicidal compounds of the invention involve the following substances:

(1) N - 3′,3′ - dichloro - 2′ - propenyl - 1,2,3,6 - tetrahydrophthalimide

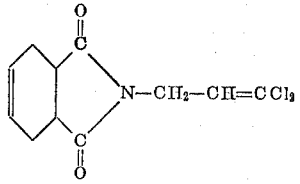

(2) N - 5′,5′ - dichloro - 4′ - pentenyl - 1,2,3,6 - tetrahydrophthalimide

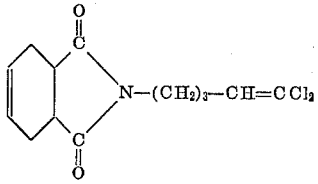

(3) N - 7′,7′ - dichloro - 6′ - heptenyl - 1,2,3,6 - tetrahydrophthalimide

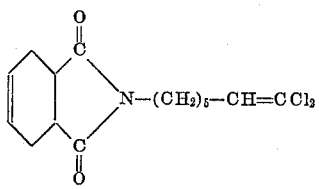

(4) N - 9′,9′ - dichloro - 8′ - nonenyl - 1,2,3,6 - tetrahydrophthalimide

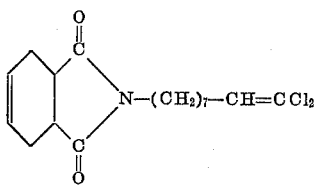

These compounds can be prepared by the following reaction formula:

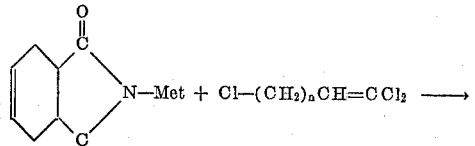

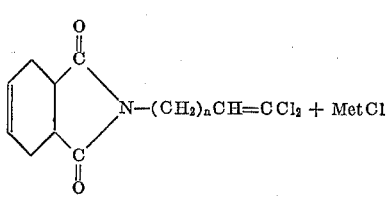

In the above formula Met shows alkali metal atoms.

This reaction is preferably carried out in a solvent, such as, acetone, cyclohexanone, benzene, toluene, etc. Moreover, in order to effect the reaction smoothly and in a high yield, it is preferable to effect the reaction in dimethylformamide, dimethylsulfoxide or ethylene glycol. The reaction proceeds at a temperature of 50 to 200° C., preferably, 100 to 160° C.

It is preferable that the reaction mole ratio of trichloroalkene to tetrahydrophthalimidealkali metal salt is 1 to 1–1.3.

The above described preparation will be explained in more detail.

(1) Preparation of N-7',7'-dichloro-6'-heptenyl-1,2,3,6-tetrahydrophthalimide:

Ten grams of sodium tetrahydrophthalimidate were suspended into 100 ml. of dimethylformamide and 10 g. of 1,1,7-trichloroheptene-1 were added thereto and then the resulting mixture was heated and subjected to a reflux for five hours, while stirring. After the reaction was completed, the reaction mixture was filtered and the filtrate was concentrated under vacuum and the remained solution was dissolved in 200 ml. of benzene and then the resulting solution was washed with water and thereafter benzene layer was dried with anhydrous sodium sulfate. After drying, the benzene was distilled off to obtain 13 g. of a fraction having a boiling point of 160 to 170° C./0.05 mm. Hg as the object product. The yield was 80.3% based on trichloroheptene. The product was light yellow transparent liquid and had a refractive index of 1.5273 (17° C.).

(2) Preparation of N-5',5'-dichloro-4'-pentenyl-1,2,3,6-tetrahydrophthalimide:

In 150 ml. of dimethylsulfoxide were suspended 10.4 g. (0.6 mol) of sodium tetrahydrophthalimidate and 8.7 g. of 1,1,5-trichloropentene-1 were added thereto and the resulting mixture was heated at a temperature of 150 to 160° C. for 5 hours to complete the reaction. After the reaction is completed, the reaction mixture was poured into 1l of water to separate oil, which was extracted with 250 mg. of benzene and then the extract was washed with water. The benzene layer was dried by anhydrous sodium sulfate and the benzene was distilled off and thereafter distillation was effected to obtain 11.7 g. of a residue having a boiling point of 143° to 154° C./0.015 mm. Hg as the object product. The yield was 81% based on trichloropentene. This product was light yellow transparent liquid and had a refractive index of 1.5369 (18° C.).

The compounds according to the present invention are mixed with inert diluents, such as, carriers and if necessary, surfactants to form dusts, wettable powders, emulsifiable concentrates or tablets.

When using, the dusts are spread directly on stem and leaves of the arigculture plants and further the wettable powders, emulsifiable concentrates or tablets are sprayed on the stem and leaves after diluted with water.

For example, these compounds are mixed with various solid carriers, such as, clays, kaolin, talc, diatomaceous earth, mica, silica, sawdust, etc., to prepare dusts.

The above described solid carriers and the compounds of the invention were mixed with a wetting and spreading agent consisting of a mixture of one or more surfactants to prepare wettable powders.

Furthermore, liquid carriers, such as, benzene, xylene, kerosene, alcohol, acetone, methylnaphthalene, animal and vegetable oils, fatty acid ester, water, etc. and the compounds of the invention were mixed with emulsifiers consisting of one or more surfactants to prepare emulsifiable concentrates.

The surfactants include non-ionic surfactants, such as, polyoxyethylene alkyl aryl ether, alkyl aryl sorbitan monolaurate, etc.; cationic surfactants, such as alkyl dimethyl benzyl ammonium chloride, alkyl pyridium halide, etc.; anionic surfactants, such as, alkylbenzene sulfonates, lignin sulfonates, fatty alcohol sulfates, etc. and amphoteric surfactants, such as, alkyldimethyl betaine, dodecyl aminoethylglycine, etc.

Of course, it is possible to improve and assure the activity by mixing assistants, for example, surfactants, such as spreading agent, adhesive etc.

This invention will be further explained in detail by the following examples, but the active ingredient, additive and the composition ratio thereof can be varied within a broad scope.

EXAMPLE 1

Dust

Five parts by weight of N-7',7'-dichloro-6'-heptenyl-1,2,3,6-tetrahydrophthalimide, 50 parts by weight of talc, 44.5 parts by weight of kaolin and 0.5 part by weight of calcium stearate were mixed and milled. The obtained dust was spread by a duster.

EXAMPLE 2

Wettable powder

Twenty parts by weight of N-5',5'-dichloro-4'-pentenyl-1,2,3,6-tetrahydrophthalimide, 10 parts by weight of diatomaceous earth, 65 parts by weight of kaolin and 5 parts by weight of a wetting and spreading agent (comprising polyoxyethylene alkylphenyl ether, polyoxyethylene fatty acid ester and polyoxyethylene phenyl phenol ether) were mixed and milled. The resulting composition was diluted with water and then sprayed.

EXAMPLE 3

Emulsifiable concentrate

Forty parts by weight of N-7',7'-dichloro-6'-heptenyl-1,2,3,6-tetrahydrophthalimide, 40 parts by weight of xylene, 20 parts by weight of an emulsifier (comprising polyoxyethylene alkylphenyl ether, polyoxyethylene fatty acid ester and alkylaryl sulfonate) were mixed and dissolved. The resulting solution was diluted with water and then sprayed.

In order to show the activity of the compound of the present invention, experimental results for prevention of plant diseases were shown hereinafter.

EXPERIMENTAL EXAMPLE 1

Test on rice blast

Twenty seeds of rice plant (species, Aichiasahi) were seeded in a pot having a diameter of 12 cm. At 4 leaf stage these rice plants were sprayed and inoculated with suspensions of conidia of *Piricularia oryzae* taken from the diseased leaves. Next day aqueous suspensions obtained by diluting 20% wettable powder containing the compounds listed in the following table with water into 200 times (concentration of active ingredient is 1000 p.p.m.) were sprayed on the rice plants. 5 days after the inoculation, the diseased spots which were cured or became inactive by said treatment and the developing diseased spots were observed. The rate of number of the developing diseased spots per number of the total diseased spots was calculated and the results are shown in Table 1.

TABLE 1

| Compound | Rate of the developing diseased spots per the total diseased spots (percent) | Phytotoxicity |
| --- | --- | --- |
| 1 | 3.1 | None |
| 2 | 1.5 | None |
| 3 | 0.0 | None |
| 4 | 0.0 | None |
| Non-sprayed | 100.0 | None |

EXPERIMENTAL EXAMPLE 2

Test or sheath blight on rice plant

Three rice plants at early stage (species, Aichiasahi) were planted in a pot having a diameter of 12 cm. and at 5 leaf stage, said rice plants were sprayed with suspensions in which the wettable powders prepared as in Example 2 were diluted with water into a concentration of 1000 p.p.m. Next day, rice plants were inoculated with *Pellicularia sasakii* on the bottoms of said plants. After the inoculation, these plants were kept in a wet chamber for 10 days and the height of the diseased spots was observed. The preventive value calculated from the following equation is shown in Table 2.

TABLE 2

| Compound | Concentration (p.p.m.) | Preventive value | Phytotoxicity |
|---|---|---|---|
| 1 | 1,000 | 67.1 | None |
| 2 | 1,000 | 86.7 | None |
| 3 | 1,000 | 92.5 | None |
| 4 | 1,000 | 73.1 | None |
| Non-sprayed | 0 | 0 | None |

Preventive value = $\dfrac{\text{Height of the diseased spots in the non-sprayed pot—that of the sprayed pot}}{\text{Height of the diseased spots in the non-sprayed spot}} \times 100$

EXPERIMENTAL EXAMPLE 3

Test on anthracnose on cucumber

Cucumber plants at early stage (species, Sagamihan-paku) 10 days after seeded, were sprayed with suspensions in which the wettable powders as described in Example 2 were diluted with water into a concentration of 1000 p.p.m. Next day, these plants were inoculated with *Colletotrichum lagenarium* and kept in wet chamber for 2 days, and then 7 days after the inoculation, number of the diseased spots developed on the cotyledons was observed. The preventive value calculated by the following equation is shown in Table 3.

TABLE 3

| Compound | Concentration (p.p.m.) | Number of the diseased spots/20 leaves | Preventive value | Phytotoxicity |
|---|---|---|---|---|
| 1 | 1,000 | 96 | 82.0 | None |
| 2 | 1,000 | 29 | 94.5 | None |
| 3 | 1,000 | 7 | 98.8 | None |
| 4 | 1,000 | 18 | 96.8 | None |
| Zinc ethylene bisdithiocarbamate | 1,620 | 4 | 99.2 | None |
| Non-sprayed | 0 | 537 | 0 | None |

Preventive value = $\dfrac{\text{Number of the diseased spots in non-sprayed pot} - \text{number of the diseased spots in sprayed pot}}{\text{Number of the diseased spots in non-sprayed pot}}$ In the above described tables in the Experimental Examples, the compounds 1, 2, 3 and 4 correspond to N-3′,3′-dichloro-2′-propenyl - 1,2,3,6 - tetrahydrophthalimide, N-5′,5′-dichloro-4′-pentenyl - 1,2,3,6 - tetrahydrophthalimide, N-7′,7′-dichloro-6′-heptenyl - 1,2,3,6 - tetrahydrophthalimide and N-9′,9′-dichloro-8′-nonenyl-1,2,3,6-tetrahydrophthalimide respectively.

What I claim is:

1. A method for controlling phytopathogenic fungi and bacteria comprising applying to the plant to be protected a fungicidally and bactericidally effective amount of tetrahydrophthalimide having the formula:

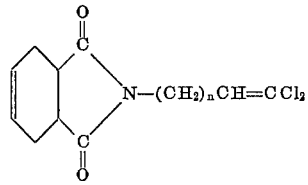

wherein $n$ is an integer selected from the group consisting of 1, 3, 5 and 7.

2. A method for controlling phytopathogenic fungi and bacteria according to claim 1, wherein the terthaydrophthalimide is selected from the group consisting of N - 3′,3′-dichloro-2′-propenyl-1,2,3,6-tetrahydrophthalimide, N - 5′,5′ - dichloro - 4′ - pentenyl-1,2,3,6-tetrahydrophthalimide, N - 7′,7′ - dichloro-6′-heptenyl-1,2,3,6-tetrahydrophthalimide and N-9′,9′-dichloro-8′-nonenyl-1,2,3,6-tetrahydrophthalimide.

References Cited

UNITED STATES PATENTS

| 2,613,221 | 10/1952 | Ladd et al. | 260—493 |
| 2,790,749 | 4/1957 | Kerk. | |
| 2,904,553 | 9/1959 | Sasse et al. | 260—326 |

OTHER REFERENCES

Schmidt, 3a,4,7,7a Tetrahydroisomdaline and N-Substituted Derivatives, Feb. 12, 1959, p. 233.

ALBERT T. MEYERS, Primary Examiner

ALLEN J. ROBINSON, Assistant Examiner

U.S. Cl. X.R.

260—326